(12) United States Patent
Kyung et al.

(10) Patent No.: US 10,379,647 B2
(45) Date of Patent: Aug. 13, 2019

(54) TOUCHSCREEN REMOTE INPUT DEVICE

(71) Applicant: WIFO CORPORATION, Seoul (KR)

(72) Inventors: Kyoo Chang Kyung, Seoul (KR); Deok In Yoon, Anyang-si (KR)

(73) Assignee: WIFO CORPORATION, Seoul (KR)

( * ) Notice: Subject to any disclaimer, the term of this patent is extended or adjusted under 35 U.S.C. 154(b) by 0 days.

(21) Appl. No.: 15/742,019

(22) PCT Filed: Jun. 23, 2016

(86) PCT No.: PCT/KR2016/006714
§ 371 (c)(1),
(2) Date: Jan. 4, 2018

(87) PCT Pub. No.: WO2017/007154
PCT Pub. Date: Jan. 12, 2017

(65) Prior Publication Data
US 2018/0203533 A1    Jul. 19, 2018

(30) Foreign Application Priority Data
Jul. 5, 2015 (KR) .................. 10-2015-0095638

(51) Int. Cl.
*G06F 3/041* (2006.01)
*B25J 15/04* (2006.01)
*G06F 3/044* (2006.01)
*G06F 3/0354* (2013.01)

(52) U.S. Cl.
CPC .......... *G06F 3/041* (2013.01); *B25J 15/0475* (2013.01); *G06F 3/03547* (2013.01); *G06F 3/044* (2013.01); *G06F 2203/0383* (2013.01)

(58) Field of Classification Search
CPC .................................. G06F 3/041; G06F 3/01
See application file for complete search history.

(56) References Cited

U.S. PATENT DOCUMENTS

| | | | |
|---|---|---|---|
| 2008/0113150 A1* | 5/2008 | Lee | F16B 47/00 428/99 |
| 2010/0090974 A1 | 4/2010 | Jung et al. | |
| 2011/0298721 A1* | 12/2011 | Eldridge | G06F 3/0362 345/173 |
| 2014/0168100 A1* | 6/2014 | Argiro | G06F 3/0416 345/173 |

FOREIGN PATENT DOCUMENTS

| | | |
|---|---|---|
| KR | 10-2012-0038043 A | 4/2012 |
| KR | 10-2012-0094978 A | 8/2012 |
| KR | 10-2012-0098039 A | 9/2012 |
| KR | 10-2014-0023556 A | 2/2014 |

* cited by examiner

*Primary Examiner* — Christopher J Kohlman
(74) *Attorney, Agent, or Firm* — Maschoff Brennan

(57) ABSTRACT

A touchscreen remote input device, according to one embodiment of the present invention, comprises: a conductive vacuum attachment member vacuum-attached to a touchscreen; a relay switch electrically connected to the conductive vacuum attachment member; and a microcontroller unit configured to control an on/off operation of the relay switch.

2 Claims, 5 Drawing Sheets

TOUCHSCREEN REMOTE INPUT DEVICE

TECHNICAL FIELD

The present invention relates to a touchscreen remote input device, and more particularly, to a touchscreen remote input device that allows a user to remotely and correctly perform a touchscreen input operation without a time delay rather than directly touching a touchscreen by attaching a conductive vacuum attachment member of the touchscreen remote input device to the touchscreen and controlling very low power transmitted to the touchscreen through a relay.

BACKGROUND ART

In general, a touchscreen refers to a device incorporating an input detection means into a display means. The touchscreen includes a display unit, such as a liquid crystal display (LCD), and a touch panel disposed on the display unit. The touchscreen does not use a mechanical keypad, but recognizes the position of a human finger or other objects touching a character or a specific position on the screen, thereby receiving the user's input through contact with the touchscreen.

Since the touchscreen requires no mechanical keypad and is easily operated, it is widely used as a guide display device in public places such as a subway, a department store and a bank which people often visit. Touchscreens are also widely applied to various terminals for sale. In recent years, it has been widely used in portable terminals such as mobile phones, DMB (Digital Multimedia Broadcasting) receivers, and car navigation systems.

The types of touch panels include a resistive type, a capacitive type, an electromagnetic type, a surface acoustic wave (SAW) type, and an infrared type. These various types of touch panels are employed for electronic products in consideration of signal amplification, difference in resolution, difficulty of design and processing technology, optical properties, electrical properties, mechanical properties, environmental properties, input properties, durability, and economic feasibility. Currently, the capacitive touch panel has the widest range of applications. The capacitive touch panel has a conductive layer formed on a film and connected to a controller via a connection terminal. Thus, the capacitive touch panel senses the position of a touch area by sensing change in capacitance of the corresponding area of the touch panel according to contact of a finger, a stylus, or the like.

As described above, capacitive touch panels are widely distributed and used in various fields. The capacitive touch panels have a limitation in that they require the user's body part such as fingers to contact the touch panel. This is not a big problem when the user holds and uses the touchscreen. However, in cases where the user needs to manipulate the touchscreen while performing other tasks with both hands, for example, a case where a guitar player needs to turn the page of sheet music displayed on the touchscreen while playing the guitar, or a case where the user uses the touchscreen positioned above the user while lying in bed, the user is required to stretch his or her arm in a direction opposite to the direction of gravity to manipulate the touchscreen, and thus cannot assume a comfortable resting position. In addition, when gaming is enjoyed on the touchscreen, strong touch the touchscreen frequently occurs. In this case, excessive physical pressure beyond simple touch is often applied to the touchscreen during gaming due to the excessive touch by the user. This causes a serious problem in terms of durability of the touchscreen. Accordingly, there is a need for a new touchscreen input technology that allows a user to remotely execute a touch input event to a touchscreen accurately and easily without directly touching the touchscreen.

DISCLOSURE

Technical Problem

Therefore, the present invention has been made in view of the above problems, and it is one object of the present invention to provide a touchscreen remote input device that allows a user to remotely and correctly perform a touchscreen input operation without a time delay rather than directly touching a touchscreen by attaching a conductive vacuum attachment member of the touchscreen remote input device to the touchscreen and controlling very low power transmitted to the touchscreen through a relay.

Technical Solution

In accordance with one aspect of the present invention, provided is a touchscreen remote input device including a conductive vacuum attachment member vacuum-attached to a touchscreen; a relay switch electrically connected to the conductive vacuum attachment member; and a microcontroller unit configured to control an on/off operation of the relay switch.

The vacuum attachment member of the touchscreen remote input device is composed of a mixture of silicone and carbon, and is formed by mixing a carbon liquid and a silicone liquid, stirring the mixture, and solidifying the mixture.

The vacuum attachment member of the touchscreen remote input device is formed by mixing 30% to 40% by weight of the carbon liquid and 60% to 70% by weight of the silicone liquid.

The touchscreen remote input device according further includes a conductive relay member formed at an upper end of the conductive vacuum attachment member and electrically connected to the relay switch to relay an electrical connection between the conductive vacuum attachment member and the relay switch; and a wired/wireless communication module configured to perform communication between an external terminal and the microcontroller unit, wherein the microcontroller unit controls the on/off operation of the relay switch according to a control signal for the relay switch received from the external terminal.

In accordance with another aspect of the present invention, provided is a touchscreen remote input device including a vacuum attachment member vacuum-attached to a touchscreen; a relay switch formed on an upper end of the vacuum attachment member; a conductive strip attached to an outer surface of the vacuum attachment member, the conductive strip electrically connecting the relay switch and the touchscreen; and a microcontroller unit configured to control an on/off operation of the relay switch.

The touchscreen remote input device further includes a conductive relay member formed between the upper end of the vacuum attachment member and the relay switch and electrically connected to the conductive strip and the relay switch; and a wired/wireless communication module configured to perform communication between an external terminal and the microcontroller unit, wherein the microcontroller unit controls the on/off operation of the relay switch according to a control signal for the relay switch received from the external terminal.

Advantageous Effects

According to a touchscreen remote input device of the present invention, a user can accurately and easily execute a touch input event for the touchscreen remotely without directly touching the touchscreen.

Particularly, according to the touchscreen remote input device of the present invention, even if the user does not directly touch the touchscreen with a finger or a stylus, the user can accurately and quickly execute a touch input event using a foot or other body parts of the user while performing other tasks by hand.

In addition, according to the touchscreen remote input device of the present invention, only a minimum required power is supplied to a capacitive touchscreen to execute a touch input event for a capacitive touchscreen. Accordingly, deterioration in durability of the touchscreen, which is caused by physical touch of the user, may be minimized.

BEST MODE

Hereinafter, embodiments of the present invention will be described in detail with reference to the accompanying drawings.

Figure 1:
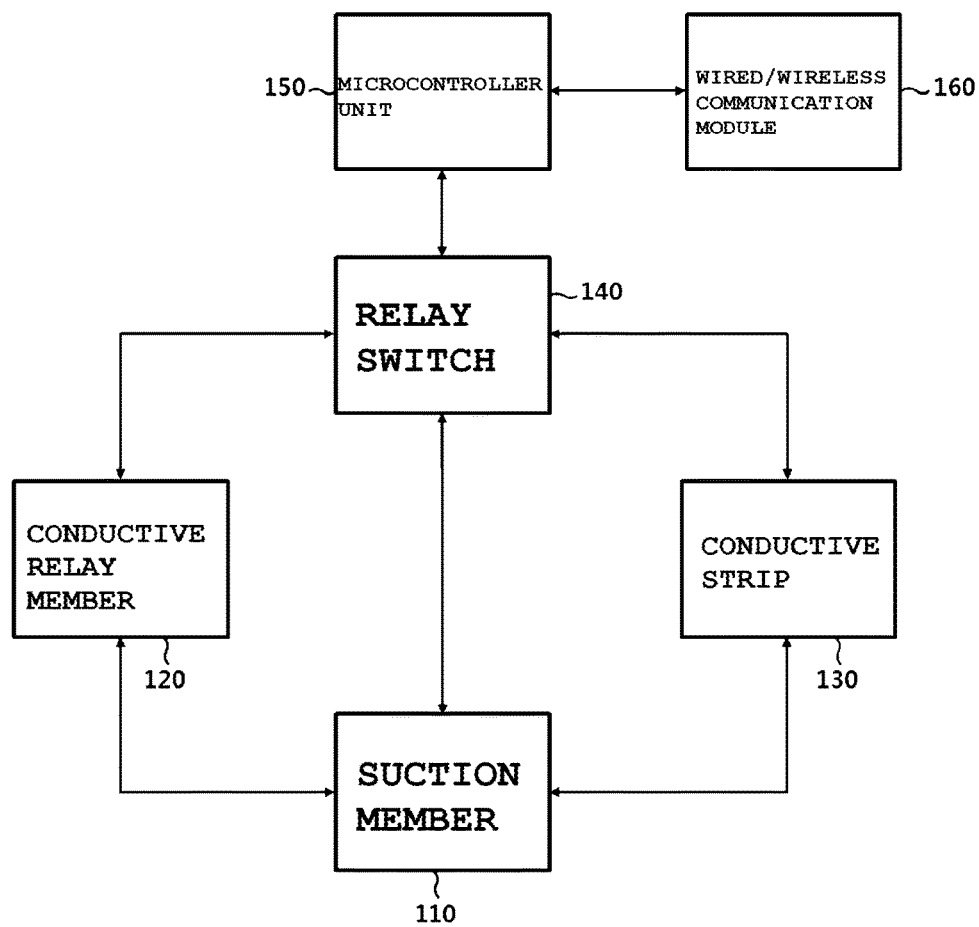
FIG. 1 is a block diagram illustrating configuration of a touchscreen remote input device according to the present invention.

FIG. 1 is a block diagram illustrating configuration of a touchscreen remote input device according to the present invention.

The touchscreen remote input device according to the present invention includes a vacuum attachment member 110, a conductive relay member 120, a conductive strip 130, a relay switch 140, a microcontroller unit 150, and a wired/wireless communication module 160. Among the elements, the conductive relay member 120 and the conductive strip 130 may or may not be included in the touchscreen remote input device.

The vacuum attachment member 110 may be attached to a device including a touchscreen. In particular, the vacuum attachment member 110 may be attached to a capacitive touchscreen device. The vacuum attachment member 110 may be vacuum-attached to the touchscreen using an air compression technique. According to an embodiment of the present invention, the vacuum attachment member 110 may include a conductive material. For this purpose, the conductive vacuum attachment member 110 may be composed of a mixture of silicone and carbon. The conductive vacuum attachment member 110 may be manufactured by mixing a carbon liquid and a silicone liquid, stirring, and then solidifying the mixture. In this case, the conductive vacuum attachment member 110 may be formed by mixing 30% to 40% by weight of the carbon liquid and 60% to 70% by weight of the silicone liquid. As described above, the conductive vacuum attachment member 110 may become conductive due to the mixture of carbon and silicone, which are conductive materials, and thus be implemented as a medium that transmits electric power to the touchscreen to which the vacuum attachment member is vacuum-attached.

According to another embodiment of the present invention, the vacuum attachment member 110 may be embodied as a general vacuum attachment member which is composed only of silicone and does not have a conductive property. In this case, a conductive strip 130 may be attached to the outer surface of the vacuum attachment member 110. The conductive strip 130 may be formed in a line shape with a material having a conductive property and attached to the outer surface of the vacuum attachment member 110, like a tape. That is, the vacuum attachment member 110 may be merely vacuum-attached to the touchscreen through suction, and power transmission to the touchscreen may be realized through the conductive strip 130 attached to the outer surface of the vacuum attachment member 110.

The relay switch 140 is electrically connected to the vacuum attachment member 110. The relay switch 140 may be formed at the upper end of the vacuum attachment member 110 and be electrically connected to the vacuum attachment member 110. When the vacuum attachment member 110 is implemented so as to be conductive, the relay switch 140 may be electrically connected to the vacuum attachment member 110 through physical contact. When the vacuum attachment member 110 is implemented so as to be nonconductive, the relay switch 140 may be electrically connected to the conductive strip 130 formed on the outer surface of the vacuum attachment member 110. That is, the medium of electrical connection between the relay switch 140 and the touchscreen may be realized by the conductive vacuum attachment member 110 or the conductive strip 130.

The conductive relay member 120 may be formed at the upper end of the vacuum attachment member 110 and be electrically connected to the relay switch 140 to relay electrical connection between the vacuum attachment member 110 and the relay switch 140. When the vacuum attachment member 110 is implemented so as to be conductive, the conductive relay member 120 may physically contact the upper end of the vacuum attachment member 110 to function as a medium of electrical connection among the relay switch 140, the conductive vacuum attachment member 110, and the touchscreen. When the vacuum attachment member 110 is implemented so as to be nonconductive, the conductive relay member 120 may be connected to the conductive strip 130 formed on the outer surface of the vacuum attachment member 110 to function as a medium of electrical connection among the relay switch 140, the conductive strip 130, and the touchscreen. The conductive relay member 120 is configured to maximize efficiency of electrical connection between the relay switch 140 and the touchscreen, but is not implemented as an essential element of the touchscreen remote input device of the present invention. Depending on the determination of a person having an ordinary skill in the art, the installation and implementation shape and operation of the conductive relay member 120 may be modified and adopted in various ways. The microcontroller unit (MCU) 150 controls the on/off operation of the relay switch 140. The wired/wireless communication module 160 performs communication between an external terminal and the MCU 150. The wired/wireless communication module 160 may be implemented as a wired terminal or implemented as a terminal or module supporting various short-range wired/wireless communication schemes such as a ZigBee module, a Bluetooth module, or a UWB (ultra-wideband) module.

When the wired/wireless communication module 160 receives a relay switch control signal from an external terminal or a server, the MCU 150 controls the on/off operation of the relay switch 140 according to the relay switch control signal. When the relay switch 140 switches to the ON state, the capacitive touchscreen may be electrically connected to the external ground, and thus the electric charge of the touchscreen may rapidly change, thereby triggering a touch input event in an area where the vacuum attachment member 110 is attached. That is, the user may remotely cause the touch input event for the touchscreen to take place by only transmitting the relay switch control signal to the MCU 150 through the wired/wireless communication module 160 without directly touching the touchscreen with a finger.

Figure 2:
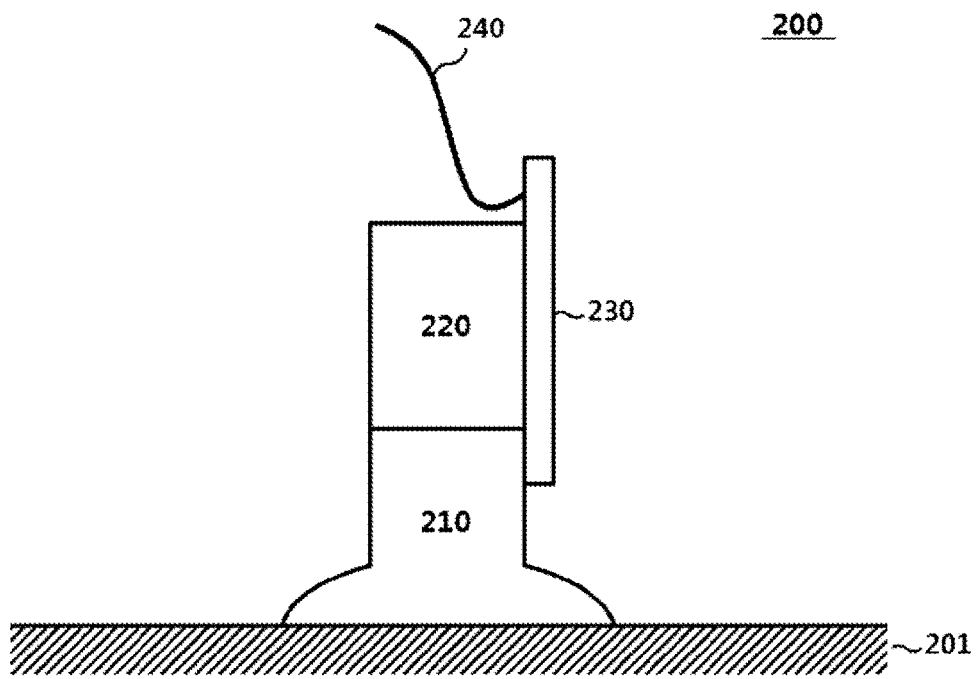
FIG. 2 is a view illustrating a touchscreen remote input device according to embodiment 1-1 of the present invention.

FIG. 2 is a view illustrating a touchscreen remote input device according to embodiment 1-1 of the present invention. The touchscreen remote input device 200 according to embodiment 1-1 of the present invention includes a conductive vacuum attachment member 210, a relay switch 220, an MCU 230, and a wired communication module 240. The conductive vacuum attachment member 210 may be made of a mixture of carbon and silicone and vacuum-attached to the touchscreen 201. The relay switch 220 may be disposed at the upper end of the conductive vacuum attachment member 210 and electrically connected to the conductive vacuum attachment member 210 through physical contact between the line of the relay switch 220 and the conductive vacuum attachment member 210. The line of the relay switch 220 may be connected to the MCU 230 such that the on/off operation of the switch may be controlled. The MCU 230 may be connected to an external terminal through a wired line 240 to receive a relay switch control signal from the external terminal and thereby control the on/off operation of the relay switch 220.

Figure 3:
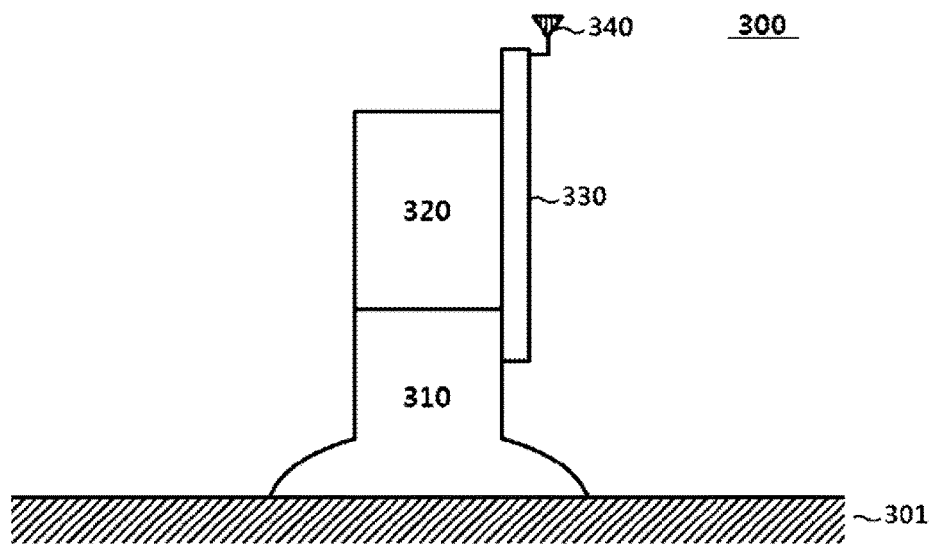
FIG. 3 is a view illustrating a touchscreen remote input device according to embodiment 1-2 of the present invention.

FIG. 3 is a view illustrating a touchscreen remote input device according to embodiment 1-2 of the present invention. A touchscreen remote input device 300 according to embodiment 1-2 of the present invention includes a conductive vacuum attachment member 310, a relay switch 320, an MCU 330, and a wireless communication module 340. The conductive vacuum attachment member 210 may be made of a mixture of carbon and silicone and attached to a touchscreen 301. The relay switch 320 may be disposed at the upper end of the conductive vacuum attachment member 310 and electrically connected to the conductive vacuum attachment member 310 through physical contact between the line of the relay switch 320 and the conductive vacuum attachment member 310. The line of the relay switch 320 may be connected to the MCU 330 such that the on/off operation of the switch may be controlled. The MCU 330 may be connected to an external terminal through the wireless communication module 340 to receive a relay switch control signal from the external terminal and thereby controlling the on/off operation of the relay switch 320.

Figure 4:
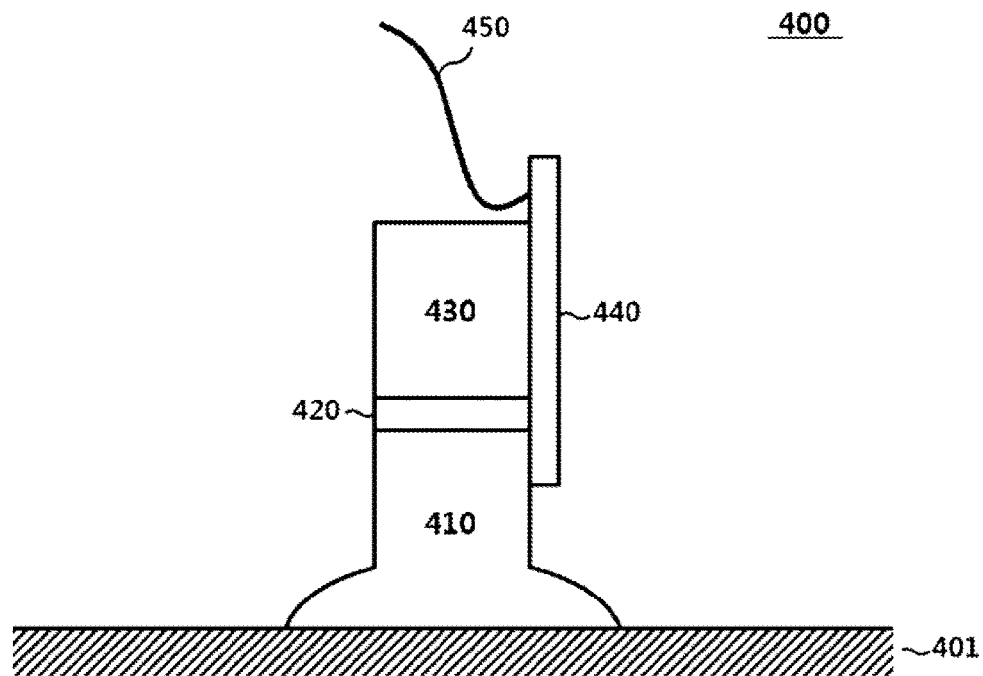
FIG. 4 is a view illustrating a touchscreen remote input device according to embodiment 2-1 of the present invention.

FIG. 4 is a view illustrating a touchscreen remote input device according to embodiment 2-1 of the present invention.

A touchscreen remote input device 400 according to embodiment 2-1 of the present invention includes a conductive vacuum attachment member 410, a conductive relay member 420, a relay switch 430, an MCU 440, and a wired communication module 450. The conductive vacuum attachment member 410 may be made of a mixture of carbon and silicone and vacuum-attached to a touchscreen 401. The conductive relay member 420 may be disposed at the upper end of the conductive vacuum attachment member 410 so as to physically contact the conductive vacuum attachment member 410. The relay switch 220 may be disposed at the upper end of the conductive relay member 420 and electrically connected to the conductive relay member 420 through physical contact between a line of the relay switch 430 and the conductive relay member 420. The line of the relay switch 430 may be connected to the MCU 440 such that the on/off operation of the switch may be controlled. The MCU 440 may be connected to an external terminal through the wired line 450 to receive a relay switch control signal from the external terminal and thereby control the on/off operation of the relay switch 430.

Figure 5:
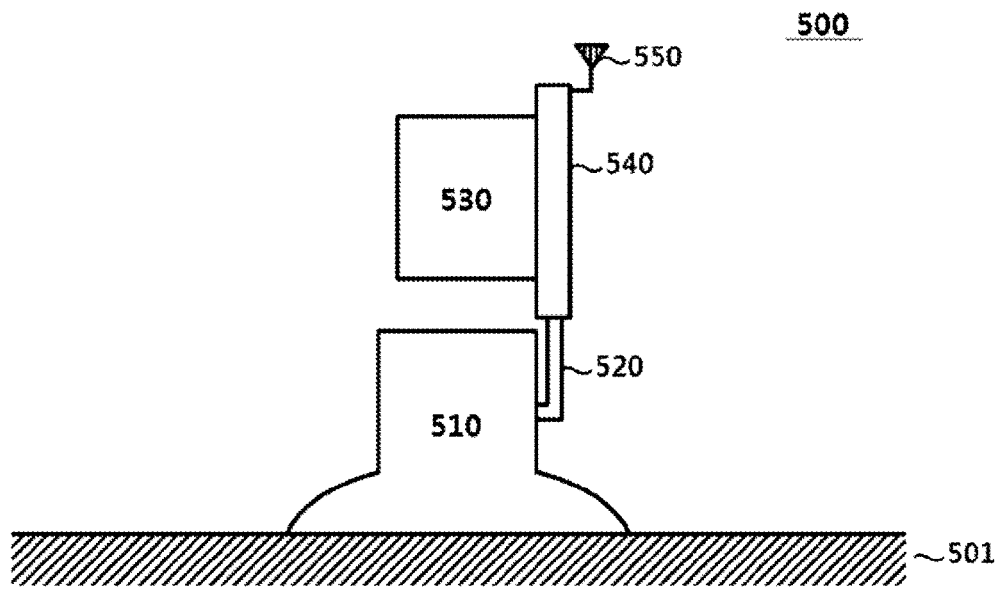
FIG. 5 is a view illustrating a touchscreen remote input device according to embodiment 2-2 of the present invention.

FIG. 5 is a view illustrating a touchscreen remote input device according to embodiment 2-2 of the present invention. A touchscreen remote input device 500 according to embodiment 2-2 of the present invention includes a conductive vacuum attachment member 510, a conductive relay member 520, a relay switch 530, an MCU 540, and a wireless communication module 550. The conductive vacuum attachment member 510 may be made of a mixture of carbon and silicone and vacuum-attached to a touchscreen 501.

One end of the conductive relay member 520 may be physically attached to a side end of the conductive vacuum attachment member 510. The other end of the conductive relay member 520 may be connected to a line of the relay switch 530 through the MCU 540. The conductive relay member 520 may be implemented in a bridge shape, and thus the conductive vacuum attachment member 510 and the relay switch 530 may be electrically connected to each other while being physically spaced apart from each other. This configuration may minimize the pressure applied to the conductive relay member 520, the relay switch 530, or the MCU 540 when the conductive vacuum attachment member 510 is attached to the touchscreen 501.

The line of the relay switch 530 may be connected to the MCU 540 such that the on/off operation of the switch may be controlled. The MCU 540 may be connected to an external terminal through the wireless communication module 550 to receive a relay switch control signal from the external terminal and thereby control the on/off operation of the relay switch 530. The wireless communication module 550 may be replaced with a wired line.

Figure 6:
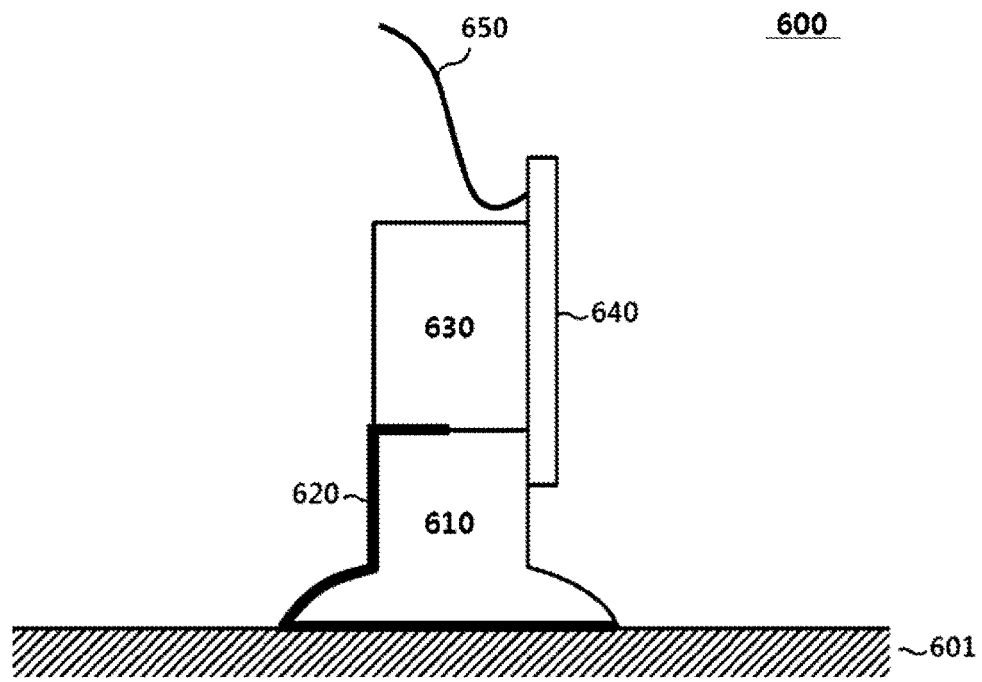
FIG. 6 is a view illustrating a touchscreen remote input device according to embodiment 3-1 of the present invention.

FIG. 6 is a view illustrating a touchscreen remote input device according to embodiment 3-1 of the present invention. A touchscreen remote input device 600 according to embodiment 3-1 of the present invention includes a vacuum attachment member 610, a conductive strip 620, a relay switch 630, an MCU 640, and a wired communication module 650. The vacuum attachment member 210 may be vacuum-attached to the touchscreen 201. The conductive strip 620 may be attached to the outer surface of the vacuum attachment member 610 in a line shape. The one end area of the conductive strip 620 may be electrically connected to the touchscreen 601 through physical contact and the other end area may be electrically connected to a line of the relay switch 630 through physical contact. The other line of the relay switch 630 may be connected to the MCU 640 such that the on/off operation of the switch may be controlled. The MCU 640 may be connected to an external terminal through a wired line 650 to receive a relay switch control signal from the external terminal and thereby control the on/off operation of the relay switch 630. The wired line 650 may be replaced with a wireless communication module.

Figure 7:
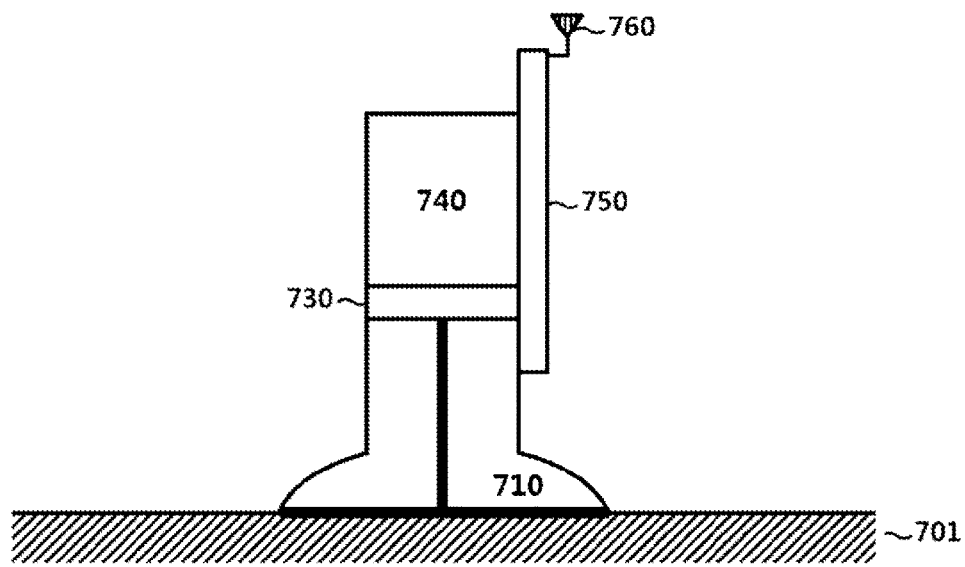
FIG. 7 is a view illustrating a touchscreen remote input device according to embodiment 3-2 of the present invention.

FIG. 7 is a view illustrating a touchscreen remote input device according to embodiment 3-2 of the present invention. A touchscreen remote input device 700 according to embodiment 3-2 of the present invention includes a vacuum attachment member 710, a conductive strip 720, a conductive relay member 730, a relay switch 740, an MCU 750, and a wireless communication module 760. The vacuum attachment member 710 may be vacuum-attached to a touchscreen 701. The conductive strip 620 may be accommodated in the form of a line inside the vacuum attachment member 710. That is, the conductive strip may be implemented in a T-shape as shown in FIG. 7. Thereby, one end area of the conductive strip may be electrically connected to the touchscreen 701 through physical contact, and the other end area may be electrically connected to the conductive relay member 730 through physical contact.

The relay switch 740 may be disposed at the upper end of the conductive relay member 730 and electrically connected to the conductive relay member 730 through physical contact between a line of the relay switch 740 and the conductive relay member 730. The other line of the relay switch 740 may be connected to the MCU 750 such that the on/off operation of the switch may be controlled. The MCU 750 may be connected to an external terminal through the wireless communication module 760 to receive a relay switch control signal from the external terminal and thereby control on/off operation of the relay switch 740. The wireless communication module 760 may be replaced with a wired line.

Figure 8:
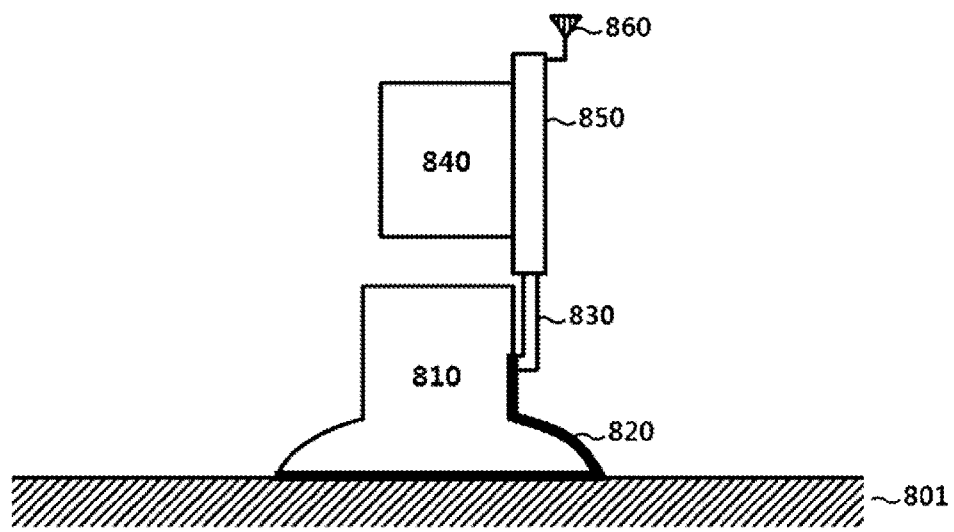
FIG. 8 is a view illustrating a touchscreen remote input device according to embodiment 3-3 of the present invention.

FIG. 8 is a view illustrating a touchscreen remote input device according to embodiment 3-3 of the present invention. A touchscreen remote input device 800 according to embodiment 3-3 of the present invention includes a vacuum attachment member 810, a conductive strip 820, a conductive relay member 830, a relay switch 840, an MCU 850, and a wireless communication module 860. The vacuum attachment member 810 may be vacuum-attached to a touchscreen 801. The conductive strip 820 may be attached to the outer surface of the vacuum attachment member 810 in a line shape. The one end area of the conductive strip 820 may be electrically connected to the touchscreen 801 through physical contact and the other end other end area may be electrically connected to the conductive relay member 830 through physical contact.

One end of the conductive relay member 830 may be physically attached to a side end of the vacuum attachment member 810. The one end of the conductive relay member 830 may be physically and electrically connected to the conductive strip 820. The other end of the conductive relay member 830 may be connected to a line of the relay switch 840 through the MCU 850. The conductive relay member 830 may be implemented in a bridge shape, and thus the vacuum attachment member 810 and the relay switch 840 may be electrically connected to each other while being physically spaced apart from each other. This configuration may minimize the pressure applied to the conductive relay member 830, the relay switch 840, or the MCU 850 when the vacuum attachment member 810 is attached to the touchscreen 801.

The other line of the relay switch 840 may be connected to the MCU 850 such that the on/off operation of the switch may be controlled. The MCU 850 may be connected to an external terminal through the wireless communication module 860 to receive a relay switch control signal from the external terminal and thereby control the on/off operation of the relay switch 840. The wireless communication module 860 may be replaced with a wired line.

Although some embodiments of the present invention have been disclosed for illustrative purposes, it is to be understood that the invention is not limited to the disclosed exemplary embodiments. Those skilled in the art will appreciate that various modifications, additions and substitutions are possible, without departing from the scope and spirit of the invention as disclosed in the accompanying Therefore, the scope of the present invention should not be construed as being limited to the embodiments set forth herein, but should be determined by the appended claims and all the equivalents thereof.

The invention claimed is:

1. A touchscreen remote input device comprising:
   a conductive vacuum attachment member vacuum-attached to a touchscreen;
   a relay switch electrically connected to the conductive vacuum attachment member; and
   a microcontroller unit configured to control an on/off operation of the relay switch,
      wherein the vacuum attachment member is composed of a mixture of silicone and carbon, and is formed by mixing a carbon liquid and a silicone liquid, stirring the mixture, and solidifying the mixture, and
      wherein the vacuum attachment member is formed by mixing 30% to 40% by weight of the carbon liquid and 60% to 70% by weight of the silicone liquid.

2. The touchscreen remote input device according to claim 1, further comprising:
   a conductive relay member formed at an upper end of the conductive vacuum attachment member and electrically connected to the relay switch to relay an electrical connection between the conductive vacuum attachment member and the relay switch; and
   a wired/wireless communication module configured to perform communication between an external terminal and the microcontroller unit,
   wherein the microcontroller unit controls the on/off operation of the relay switch according to a control signal for the relay switch received from the external terminal.

* * * * *